United States Patent Office 3,022,357
Patented Feb. 20, 1962

3,022,357
PURIFICATION OF FLUOROCARBONS
Klaus Bernd Kasper, Vienna, W. Va., assignor to E. I. du Pont de Nemours and Company, Wilmington, Del., a corporation of Delaware
No Drawing. Filed Oct. 8, 1959, Ser. No. 845,075
7 Claims. (Cl. 260—653.3)

The process of the present invention relates to the purification of fluorocarbons and, more particularly, to the purification of hexafluoropropylene.

Unsaturated fluorocarbons, such as tetrafluoroethylene and hexafluoropropylene, are extremely useful monomers which, on polymerization, give rise to high molecular weight resins having outstanding thermal stability, corrosion resistance and insulating properties. The formation of high molecular weight fluorocarbon resins, through addition polymerization of such monomers as tetrafluoroethylene and/or hexafluoropropylene, requires the use of extremely pure monomer. Impurities in the monomer stream cause telomerization through reaction with the extremely active growing polymer chain and result in the formation of low molecular weight products which may not be suitable for use as plastics.

One of the preferred methods of preparing unsaturated fluorocarbon compounds is by pyrolysis of chlorodifluoromethane at temperatures above 700° C., as disclosed in greater detail in U.S. Patent 2,551,573 which issued to Downing et al. on May 8, 1951. The process disclosed in this patent results in a large number of fluorocarbons in addition to tetrafluoroethylene and hexafluoropropylene. Hexafluoropropylene isolated by distillation from this pyrolysis process was found to contain small quantities of perfluorobutyne-2 which detrimentally affected the rate of polymerization, as well as the degree of polymerization of hexafluoropropylene, particularly in copolymerization with other ethylenically-unsaturated monomers such as tetrafluoroethylene. This impurity could not be readily removed by standard distillation techniques in view of the close boiling points of hexafluoropropylene and perfluorobutyne-2 at atmospheric pressure.

It is therefore one of the objects of the present invention to provide an improved method for preparing hexafluoropropylene. It is another object of the present invention to provide a method for the purification of hexafluoropropylene. Still another object is the separation of hexafluoropropylene from perfluorobutyne-2.

The objects of the present invention are accomplished by a process which comprises reacting a mixture of hexafluoropropylene and perfluorobutyne-2, said mixture containing the perfluorobutyne-2 in a concentration of 0.001 to 10% by weight of the hexafluoropropylene, with ammonia in a liquid phase, selected from the class consisting of water and liquefied reagents, the concentration of said ammonia being from 1 to 30 weight percent of the water when said liquid phase is water, and from 0.01 to 1.5 weight percent when said liquid phase comprises the liquefied reagents, and recovering hexafluoropropylene from the reaction mixture containing a substantially lesser amount of perfluorobutyne-2 than present in the original mixture.

Hexafluoropropylene, when prepared by the pyrolysis of chlorodifluoromethane, contains anywhere from 0.001 to 10% of perfluorobutyne-2, which, as described, deleteriously affects the polymerization of hexafluoropropylene. The present invention is based on the discovery that perfluorobutyne-2, in presence of hexafluoropropylene, reacts rapidly with ammonia to form products which are liquid or solid at temperatures below 50° C., and which are water-soluble. Thus, perfluorobutyne-2 can be removed from a hexafluoropropylene stream by reaction with ammonia followed by water scrubbing of the reaction product. Ammonia also reacts with hexafluoropropylene to result in a mixture of aminated products; however, the rate of the reaction of hexafluoropropylene with ammonia is substantially lower than the rate of reaction of perfluorobutyne-2, so that under favorable conditions yield losses of hexafluoropropylene due to reaction with ammonia are insignificant. The products formed by the reaction of hexafluoropropylene with ammonia, are soluble in water and are readily removed by water scrubbing. Favorable reaction conditions are achieved when the reaction of ammonia and the fluorocarbon mixture is carried out in a liquid phase in which the reactants are homogeneously admixed.

In general, the purification of hexafluoropropylene, in accordance with the present invention, is carried out by two major techniques. In the anhydrous and preferred method, gaseous hexafluoropropylene containing perfluorobutyne-2 is admixed with anhydrous gaseous ammonia. The mixture is condensed and allowed to remain in the liquid state for a sufficient length of time to allow complete reaction of the perfluorobutyne-2 with the ammonia. It was found that neither reaction in the gas phase nor mixing of the reagents in the liquid phase gives rise to the desired purification. In the gas phase, the reaction is extremely slow while with the liquid phase mixing, the reaction is too fast to allow the preferential reaction of ammonia with perfluorobutyne-2 to go to completion before reaction with hexafluoropropylene occurs. The reaction of ammonia with perfluorobutyne-2 while keeping the reaction of hexafluoropropylene with ammonia to a minimum is, however, accomplished when the reagents are admixed in the gas phase and then simultaneously condensed to the liquid phase. Upon reaction, pressure and/or temperature are changed so as to allow vaporization of the hexafluoropropylene. The hexafluoropropylene is then water-scrubbed to remove the by-products in the gas stream.

Using this method, it was found that up to 99% of the perfluorobutyne-2 impurity can be removed. The degree of purification partially depends on the quantity of the ammonia employed in the reaction. Thus, at least a stoichiometric quantity of the ammonia, based on the quantity of perfluorobutyne-2, should be employed. In general, the concentration of ammonia is varied between 0.01 to 1.5 weight percent or 0.1 to 12 mol percent on the basis of hexafluoropropylene. Within this range an increase in concentration of $NH_3$ will result in a higher degree of purification. Still higher concentrations result in only a slight further increase in perfluorobutyne-2 removal. Such increases are generally not warranted, since the remaining perfluorobutyne-2 in the hexafluoropropylene does not exert any apparent effect on the polymer-forming ability of the monomer. Excess quantities are undesirable in that the excess ammonia can react with the hexafluoropropylene to decrease the hexafluoropropylene recovered. The yield loss of hexafluoropropylene employing the above-described method is, in general, less than 0.5%. The purification process as described hereinabove is generally carried out at temperatures ranging from −40 to +50° C., although such temperatures are not critical from the standpoint of operability of the process. At temperatures below −40° C., the reaction rate of perfluorobutyne-2 with $NH_3$ is too slow to make the purification economically attractive. Temperatures above 50° C. are, although feasible, not generally employed, since the liquefaction of the gases involved in the process of the present invention becomes more difficult as the temperature is increased. Pressure employed is similarly not critical, but should be at least sufficient to maintain the reagents in the liquid state at the reaction temperature.

In a second method of carrying out the process of the present invention, gaseous hexafluoropropylene containing perfluorobutyne-2 is passed through an absorption tower containing an aqueous solution of ammonia. The removal of perfluorobutyne-2 is greatly improved by the presence of noble metals, including copper, which appear to act as catalysts for the reaction of perfluorobutyne-2 with $NH_3$ without catalyzing the reaction of hexafluoropropylene with $NH_3$. The concentration of the ammonia may be varied from 1 to 30 weight percent or higher, based on water, and is not critical. The quantity of noble metal employed is not critical and may be greatly varied. The temperature is generally maintained between 0 and 50° C.; higher or lower temperatures may, however, be employed. Sufficient positive pressure is maintained to pass the hexafluoropropylene through the tower.

Amines, such as dimethyl amine, also react with perfluorobutyne-2 to form analogous products. However, the rate differential between the reaction of the amine with perfluorobutyne-2 and the reaction of the amine with hexafluoropropylene is not large enough to allow efficient separation resulting in a significant yield loss of hexafluoropropylene through the reaction and/or insufficient removal of the perfluorobutyne-2.

The presence and the quantity of perfluorobutyne-2 is determined by gas chromatography as confirmed by mass spectroscopy.

The process of the present invention is further illustrated by the following examples:

Example I

A sample of hexafluoropropylene containing 6102 p.p.m. of perfluorobutyne-2 was mixed with 5 mol percent of anhydrous ammonia. The gas mixture was then passed into a capillary tube maintained at Dry Ice temperature. The tube was sealed and warmed to 30° C. under autogenous pressure for a period of 60 minutes. The reaction mixture was then allowed to vaporize and was washed with water. Analysis of the resulting hexafluoropropylene showed a perfluorobutyne-2 content of less than 10 p.p.m. No other detectable impurities were found.

Example II

Employing the procedure set forth in Example I, a hexafluoropropylene stream containing 537 p.p.m. of perfluorobutyne-2 was mixed with 1.5 mol percent of anhydrous ammonia in the gas phase, condensed, and reacted for 5 minutes at 30° C. Analysis of the washed hexafluoropropylene gas showed a perfluorobutyne-2 content of less than 10 p.p.m. and no other detectable impurities.

Example III

Employing the procedure set forth in Example II, a hexafluoropropylene stream containing 1200 p.p.m. of perfluorobutyne-2 was mixed with 1.5 mol percent of anhydrous ammonia in the gas phase, condensed, and reacted for 3 minutes at 0° C. Analysis of the washed hexafluoropropylene showed a perfluorobutyne-2 content of 60 p.p.m. and no detectable other impurity.

Example IV

Metered flows of hexafluoropropylene containing 300 p.p.m. of hexafluorobutyne-2 (1.5 ml./min. at standard conditions), and anhydrous ammonia (25 ml./min. at standard conditions) were mixed in the gas phase at room temperature and condensed in a ¼ in. I.D. stainless steel tubing of one ft. length. The temperature of the tube was maintained at −15° C. to −20° C. The liquid mixture was then passed into a tubular reactor maintained at 0° C. and at 45 p.s.i.g. Hold-up time of the reaction mixture in this reactor was 5 minutes. After passing through the reactor, the resulting liquid was vaporized and passed into a water-scrubber. The hexafluoropropylene effluent from the water scrubber contained 60 p.p.m. of perfluorobutyne-2.

Example V

Hexafluoropropylene, containing 1000 p.p.m. of perfluorobutyne-2, was passed at a pressure of 45 p.s.i.g. into an absorption tower at room temperature containing a 30% concentrated aqueous solution of ammonia and ⅛ inch steel packing. The hexafluoropropylene gas was passed at a space velocity of 0.63 g./hr./cc. of absorbing liquid for a contact time of approximately 0.05 minute. The effluent hexafluoropropylene contained 332 p.p.m. of perfluorobutyne-2. The yield loss of hexafluoropropylene as indicated by fluoride analysis of the ammonia solution was 2.75%.

Example VI

Hexafluoropropylene containing 1000 p.p.m. of perfluorobutyne-2 was passed at a pressure of 45 p.s.i.g. into an absorption tower containing a 5.5% aqueous solution of ammonia and packed with copper metal. The hexafluoropropylene was passed at a space velocity of 1.3 g./hr./ml. of absorbing liquid for a contact time of approximately 0.05 min. The effluent hexafluoropropylene contained 32 p.p.m. of perfluorobutyne-2. The yield loss of hexafluoropropylene, as indicated by fluoride analysis of the ammonia solution, was 0.38%.

The examples have illustrated certain embodiments of the present invention, and are not to be construed as limiting the invention. Various process modifications will be apparent to those skilled in the art.

Hexafluoropropylene purified by the process of the present invention has improved chemical reactivity in the field of polymerization, as well as in the field of compound synthesis.

I claim:

1. A process of separating perfluorobutyne-2 from hexafluoropropylene which comprises reacting a mixture of hexafluoropropylene and perfluorobutyne-2 with ammonia in a liquid phase selected from the class consisting of water and liquefied reagents, the concentration of said ammonia being from 1 to 30 weight percent of the liquid phase when said liquid phase is water, and from 0.01 to 1.5 weight percent when said liquid phase comprises the liquefied reagents, and recovering hexafluoropropylene.

2. The process set forth in claim 1 wherein the concentration of the perfluorobutyne is from 0.001 to 10% by weight of the hexafluoropropylene.

3. A process of separating perfluorobutyne-2 from hexafluoropropylene which comprises forming a mixture of gaseous hexafluoropropylene and perfluorobutyne-2, said mixture containing the perfluorobutyne-2 in a concentration of 0.001% to 10% by weight, with from 0.01 to 1.5 weight percent of gaseous anhydrous ammonia, condensing the resulting mixture to the liquid state at a temperature of −40 to +50° C. for a time sufficient ot allow reaction of ammonia and perfluorobutyne-2 and recovering hexafluoropropylene from the reaction mixture through vaporization.

4. The process as set forth in claim 3 wherein the recovered hexafluoropropylene is water-scrubbed.

5. A process for separating perfluorobutyne-2 from hexafluoropropylene which comprises passing a gaseous mixture of hexafluoropropylene and perfluorobutyne-2, said mixture containing perfluorobutyne-2 in a concentration of 0.001 to 10% by weight, through an aqueous solution of ammonia, containing the ammonia in a concentration of 1 to 30% by weight of water at a temperature of 0 to 50° C.

6. The process set forth in claim 5 in the presence of noble metal.

7. The process set forth in claim 5 in the presence of copper.

References Cited in the file of this patent

UNITED STATES PATENTS

| | | |
|---|---|---|
| 2,615,926 | Benning et al. | Oct. 28, 1952 |
| 2,691,036 | Miller | Oct. 5, 1954 |
| 2,722,558 | Johnston | Nov. 1, 1955 |
| 2,723,297 | Litant et al. | Nov. 8, 1955 |
| 2,729,687 | Sterling | Jan. 3, 1956 |
| 2,831,902 | Hamilton et al. | Apr. 28, 1958 |
| 2,889,378 | Boettger et al. | June 2, 1959 |